INVENTORS
KENNETH J. HUBER
JACK F. JOHNSTON
EDWARD K. NISSEN
DEWITT R. POURIE by Greene and Durr

ATTORNEYS

INVENTORS
KENNETH J. HUBER
JACK F. JOHNSTON
EDWARD K. NISSEN
DEWITT R. POURIE

ATTORNEYS

United States Patent Office 3,276,907
Patented Oct. 4, 1966

3,276,907
CONTINUOUS PRODUCTION OF INDUSTRIAL STARCH PASTES
Kenneth John Huber and Jack F. Johnston, Granite City, Ill., and Edward K. Nissen and De Witt Robert Pourie, St. Louis, Mo., assignors to Union Starch & Refining Co., Inc., Columbus, Ind., a corporation of Indiana
Filed Sept. 27, 1965, Ser. No. 490,196
2 Claims. (Cl. 127—28)

This application is a continuation-in-part of U.S. application Ser. No. 290,099, filed June 24, 1963 and now U.S. Patent No. 3,220,884.

This invention relates to an apparatus for the continuous production of starch pastes.

Among the objects of the invention is to provide an apparatus for the continuous production of starch pastes.

Among other objects of the invention is to provide an apparatus for continuously supplying a starch paste that has a relatively low and uniform viscosity and that resists gelling when stored.

Cooked starches such as used in the paper industry, for example, are conventionally prepared by the batch process. Batch prepared, cooked starches unless modified by enzyme conversion or preconverted at the producer's plant have relatively high viscosities and they tend to gel on storage. Also such batch processes are time consuming and require a maximum of attention during the cooking treatment.

Among other objects of the invention, therefore, is to provide an apparatus for preparing a starch paste of improved quality and consistency at lower handling costs.

The objects of the invention are attained by providing means for feeding an aqueous starch slurry to a steam injection heater to substantially instantly heat and gelatinize the starch, means for continuously conducting the gelatinized starch paste under pressure to continue the conversion until the starch liquor is converted to a paste having the desired paste characteristics (of a modified starch paste, for example); means for separating excess steam, etc., from the paste and for continuously collecting the paste.

This invention is especially useful with corn starch but may be employed with any type of starch such as the starches from wheat, potatoes, tapioca, rice and waxy maize. Although the invention is especially useful for treating unmodified starch thereby avoiding the treatments necessary to modify such starches, it may also be employed for treating thin-boiling, oxidized, ethylated and other chemically modified starches.

The amount of starch in the slurry depends on the particular starch employed and on the properties desired in the final product but generally the slurry will contain about ½ to 3 lbs. of starch per gallon. Various preservatives, bactericides, chemicals, etc. may be incorporated into the slurry.

The starch is fed from the slurrying tank to the steam injection zone at a constant rate. A rate of 3 to 12 gallons per minute has been found very satisfactory for a single ¾" injection nozzle for example.

The steam pressure applied to the injection nozzle may vary from about 60 to about 140 pounds per square inch gauge pressure (p.s.i.g.) to permit conversion temperatures ranging from 250 to 350° F. Below about 250° F. the starch is not completely cooked and the paste resembles that obtained by cooking at atmospheric pressure. Above about 350° F. the paste may be caramelized.

The period, from the time a given slurry leaves the nozzle assemly until it is passed out of the final cooker, will also depend on the type of starch and the properties desired in the final product but periods of about 3–12 minutes have been found to be very satisfactory.

After the starch paste leaves the injector zone, the cooking is continued under pressure at temperatures of between about 250° F. and 350° F. The pressure supplied by the steam of the injector forces the paste, in a closed system, through the chamber which is constructed to prevent channelling of the paste.

The starch paste as it leaves the final converting and pressure zone can be separated at atmospheric pressure from the excess steam and vapor by centrifugal means.

The following table summarizes conditions for satisfactory operation of the process.

|  | Optimum | Maximum | Minimum |
|---|---|---|---|
| Through-put rate (g.p.m.) | 5 | 12 | 3 |
| Steam pressure (p.s.i.g.) | 100 | 140 | 60 |
| Tank level | Full | Full | Empty |
| Retention time with full tank (min.) | 8 | [2] 3½ | 12 |
| Discharge temperature (° F.) | 320 | 350 | 250 |
| Paste concentration [1] (lb./gal.) | ½ to 3 | | |

[1] Dependent on the type of starch.
[2] The maximum is with respect to speed, etc., so that a lower retention time indicates greater speed of flow.

Figure 1:
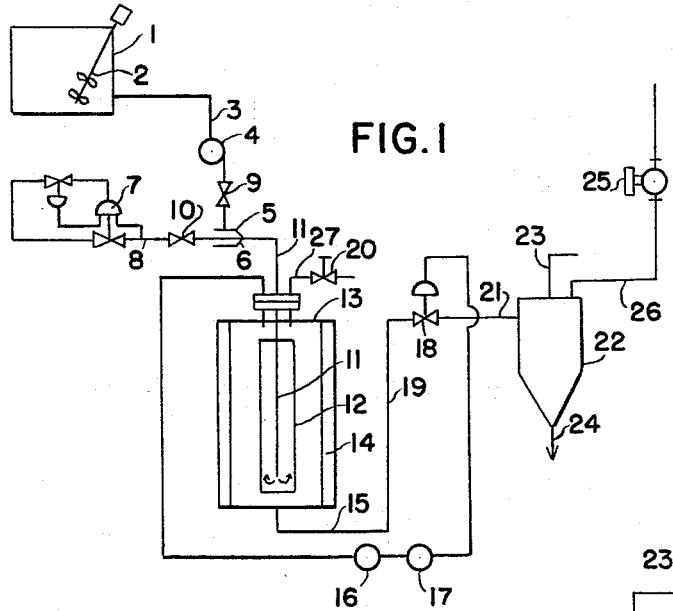
FIG. 1 is a flow diagram of the overall apparatus.

The slurry is formed in tank 1 which is provided with an agitator 2. The slurry connects through line 3 to a positive displacement pump 4 which feeds the slurry through valve 9 to the steam injector heater 5. Steam is fed through a pressure regulating and adjusting valve means 7 to line 8, valve 10 to the injector heater 5. The injection heater is shown diagrammatically in FIG. 1. Valve 10 is not essential and is omitted in FIG. 2. The granules of starch in the slurry are instantly heated in injector 5 and discharged through orifice 6 into line 11 under pressure. The end of line 11 extends into the pressure cooking vessel 13 down to within a short distance of the bottom of baffle chamber 12. The vessel 13 is closed to the atmosphere and has a heat jacket and/or insulating covering 14. Paste introduced into the bottom of the baffle chamber 12, overflows said chamber and moves toward the bottom of vessel 13 and into line 15 without producing channelling. The small needle valve 20 on the top of the tank is used only to vent off non-condensable gases and does not effectively lower the pressure inside the vessel 13. The valve 20 is connected to the inside of tank 13 through pipe 27 (partly broken away in FIG. 2).

The level of paste in vessel 13 is regulated by the automatic level transmitter 16 which senses the pressure differential between the vapor at the top of vessel 13 and the hydraulic pressure in line 15, and through controller 17, automatically adjusts the opening of valve 18 to control the flow of paste through line 19.

The paste from valve 18 flashes to atmospheric pressure through line 21 into a centrifugal separator 22. Steam and other vapors are removed through vent 23 while the final product flows through line 24. Water can be metered into the separator 22 through line 26 with the aid of a metering pump 25.

Figure 5:
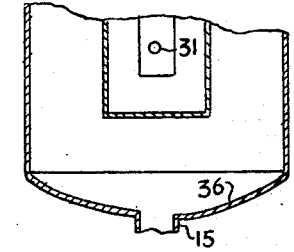
FIG. 5 is a detail view of the steam injector device.
Figure 2:
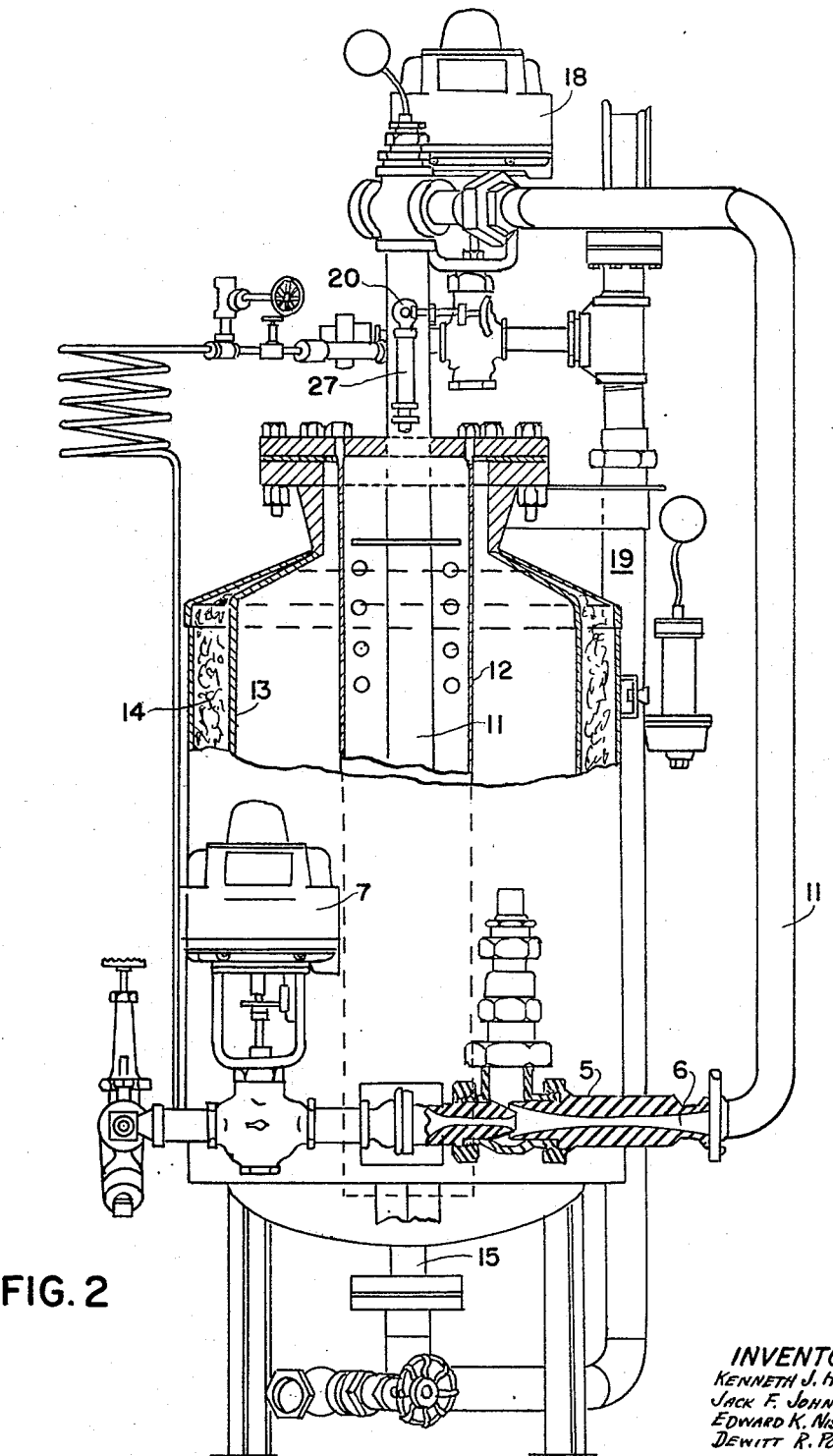
FIG. 2 is a view, partly in cross-section, of the steam injector and cooking tank portion of the apparatus.

As shown in more detail in FIG. 5, the injector-heater device 5 comprises an inlet 50 for the steam (coming from adjusting valve means 7 of FIGS. 1 or 2) and inlet 51 for the starch slurry (coming from valve 9, FIG. 1, not shown in FIGS. 2 and 5). The discharge passage 6 of the injector-heater 5 has a restricted zone 53 between the entrance 52 and the discharge opening 54. Injector heaters with a discharge passage having a restricted zone as shown are not new but among the many such injector-heaters that are available, this particular type has advantages with the present invention in that the at least partially gelatinized starch formed in the zone 52 is subjected to high shear as it passes the minimum dimension 53 of the discharge passage providing maximum viscosity reduction.

Figure 3:
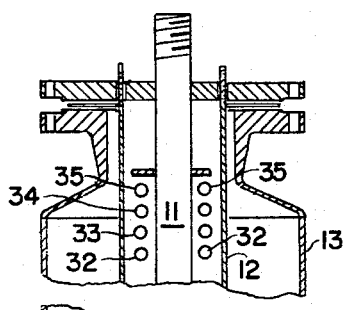
FIG. 3 is a detail view (slightly exploded) of the basic structure of the cooking tank and its connecting parts.

The internal structure of the cooker parts 11, 12 and 13 which provides for the non-channelling flow and for the dwell of the gelatinized starch therein, is apparent from FIG. 3. Thus the freshly gelatinized starch passes through line 11 to the lower end thereof where it discharges through opening 31 and/or an opening at the lower end thereof. The starch passes upwardly through baffle device 12 until it flows out through one or more openings 32, 33, 34, 35 into tank 13. The gelatinized starch then moves downwardly in tank 13 as the lowermost layers are withdrawn through opening 15 of the internally-concave bottom 36 of the vessel 13.

Figure 4:
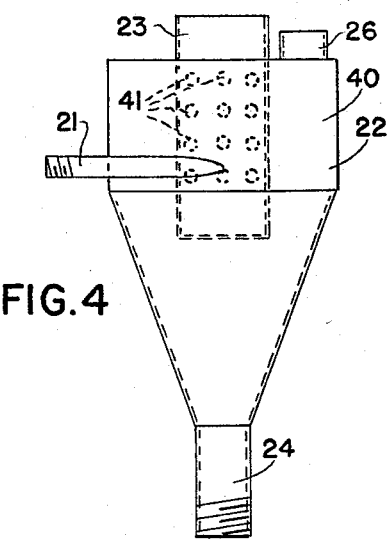
FIG. 4 is a detail view of the vapor separating means.

The gelatinized starch solution from the bottom of vessel 13 is fed tangentially into the upper cylindrical portion 40 of the separator 22 (see FIG. 4) by means of pipe 21. Water may be fed to the periphery of cylindrical portion 40 to mix with and dilute the solution and condense the excess steam. Air, uncondensed steam and other vapors are withdrawn through pipe 23, the portion of which extends into separator 22 being perforated as shown at 41 of FIG. 4. A gelatinized starch solution ready for use is withdrawn from the discharge opening 24.

In the examples which follow the viscosity was directly measured in centipoise units by means of a Brookfield viscometer using a #1 spindle at 20 revolutions per minute.

*Example 1*

A slurry containing 2 lbs. dry substance (D.S.) starch per gallon was made in the slurry vessel 1 and passed at a speed of 6 gallons per minute through the injector-heater 5 operated at a steam pressure of about 100 p.s.i.g. The tank 13 of about 50 gallon capacity was heated to 300° F. and was maintained substantially full at a pressure of 100 p.s.i.g. Dilution water at 95° F. was added at 26 in accordance with the table below.

| Dilution Water (g.p.m.) | Percent Dry Substance (Oven Method) | Viscosity (cps.)[1] |
| --- | --- | --- |
| 0 | 18.2 | 66 |
| 1 | 17.4 | 55 |
| 2 | 13.7 | 26 |
| 3 | 13.2 | 26 |
| 4 | 13.2 | 18 |
| 5 | 12.2 | 19 |
| 6 | 11.1 | 18 |
|  | 9.5 |  |

[1] Brookfield Viscometer, #1 spindle at 20 r.p.m. samples read at 140° F.

The above viscosities match the viscosity characteristics of a starch which has been chemically preconverted in the supplier's plant. For example, the viscosities correspond to what are commonly known in the trade as low viscosity oxidized starches or ethylated starches depending on the modification involved.

*Example 2*

The process was conducted as in Example 1 except that a slurry with 2.5 lbs./gal. of D.S. starch, a pump speed of 5 gal./min., a cooking temperature of 295° F. and a tank pressure of 100 p.s.i.g., were employed. Various proportions of dilution water at 95° F. were added, as indicated, produced samples with the properties set forth in the following table:

| Dilution Water (g.p.m.) | Percent Solids (RI)[1] | Dilution Temp. | Viscosity (cps.) | At Sample Temp. |
| --- | --- | --- | --- | --- |
| 0 | 25 | 210 | 420 | 136 |
| 2.9 | 15 | 206 | 56 | 135 |
| 4.0 | 14 | 203 | 42 | 140 |
| 4.8 | 12 | 199 | 41 | 137 |
| 7.3 | 10 | 186 | 26 | 139 |
| 8.9 | 8 | 176 | 24 | 140 |
| 10 | 7 | 163 | 18 | 140 |

[1] RI= Refractive index which was used as a direct indication of solids content using an Erma pocket refractometer with the standard 0-27% starch solids scale.

*Example 3*

In this example the process was conducted so as to obtain a 15% final solids paste for use directly in the machine sizing of food grade board. The original slurry contained 2.5 lb./gal. of D.S. starch, the pump speed was 5 gal./min.; the cooking tank was maintained substantially full and at a temperature of 295–300° F. The dilution water was at 70° so as to provide a paste temperature of about 150° F. when said paste reaches the sizing machine. The following samples were taken at about 15 min. intervals:

| Dilution water (g.p.m.) | Percent Solids (RI) | Viscosity (cps.) | At Sample Temp. |
| --- | --- | --- | --- |
| 3.2 | 15 | 60 | 130 |
| 3.2 | 15 | 49 | 140 |
| 3.2 | 15.5 | 30 | 140 |
| 3.3 | 15 | 31 | 140 |
| Sample of Composite | 15 | 36 | 140 |
| Sample of Composite held 1 hr. | 15 | 32 | 140 |
| 3.4 | 15 | 38 | 132 |
| 3.4 | 15 | 31 | 133 |
| 3.4 | 16.5 | 38 | 142 |
| 3.4 | 18 | 82 | 140 |
| Sample of Composite | 16.5 | 40 | 138 |

The "composites" referred to in the table were mixtures of equivalent portions of the samples immediately thereabove.

Samples of the board coated with this product were compared with samples of the board coated with an equivalent viscosity oxidized starch. Test results were substantially equivalent except for a lowering of the air permeability of the board coated with the pressure converted produced.

*Example 4*

The process was conducted as in Example 3 but with a slurry of 3 lb./gal. of D.S. starch and with dilution water added at the rate of about 5.1 gal./min. to provide a final paste of about 14% solids. The resultant pastes had a slightly higher viscosity than those of Example 3.

The features and principles underlying the invention described above in connection with specific exemplifications will suggest to those skilled in the art many other modifications thereof. It is accordingly desired that the appended claims shall not be limited to any specific features and details shown in connection with the exemplifications thereof.

We claim:
1. A continuous starch converting apparatus comprising means for forming a starch slurry,
a steam injection heater comprising means for injecting steam under pressure into a stream of slurry introduced therein,
means for feeding a continuous stream of slurry to said steam injection heater,
pressure converting means constructed to provide a continuous path for the paste therein without channelling, while maintaining the paste under pressure, pipe means connecting the steam injection heater directly to the pressure converting means whereby to maintain the latter under pressure, paste collecting means open to the atmosphere, pipe means connecting the pressure converting means to the paste collecting means, valve means connected to the upper portion of said pressure converting means for regulating release of non-condensible gases.

2. The apparatus as claimed in claim 1 comprising pressure sensing means on the pipe connecting the pressure converting means to the paste collecting means, valve means on said pipe, control means for regulating said valve in accordance with the pressure differential between tip and bottom of the pressure converting means to maintain prescribed level of paste within pressure converting means.

References Cited by the Examiner
UNITED STATES PATENTS

| | | | |
|---|---|---|---|
| 3,101,284 | 8/1963 | Etheridge | 127—28 X |
| 3,133,836 | 5/1964 | Winfrey et al. | 127—28 X |

MORRIS O. WOLK, *Primary Examiner.*

E. G. WHITBY, *Assistant Examiner.*